United States Patent Office 2,950,324
Patented Aug. 23, 1960

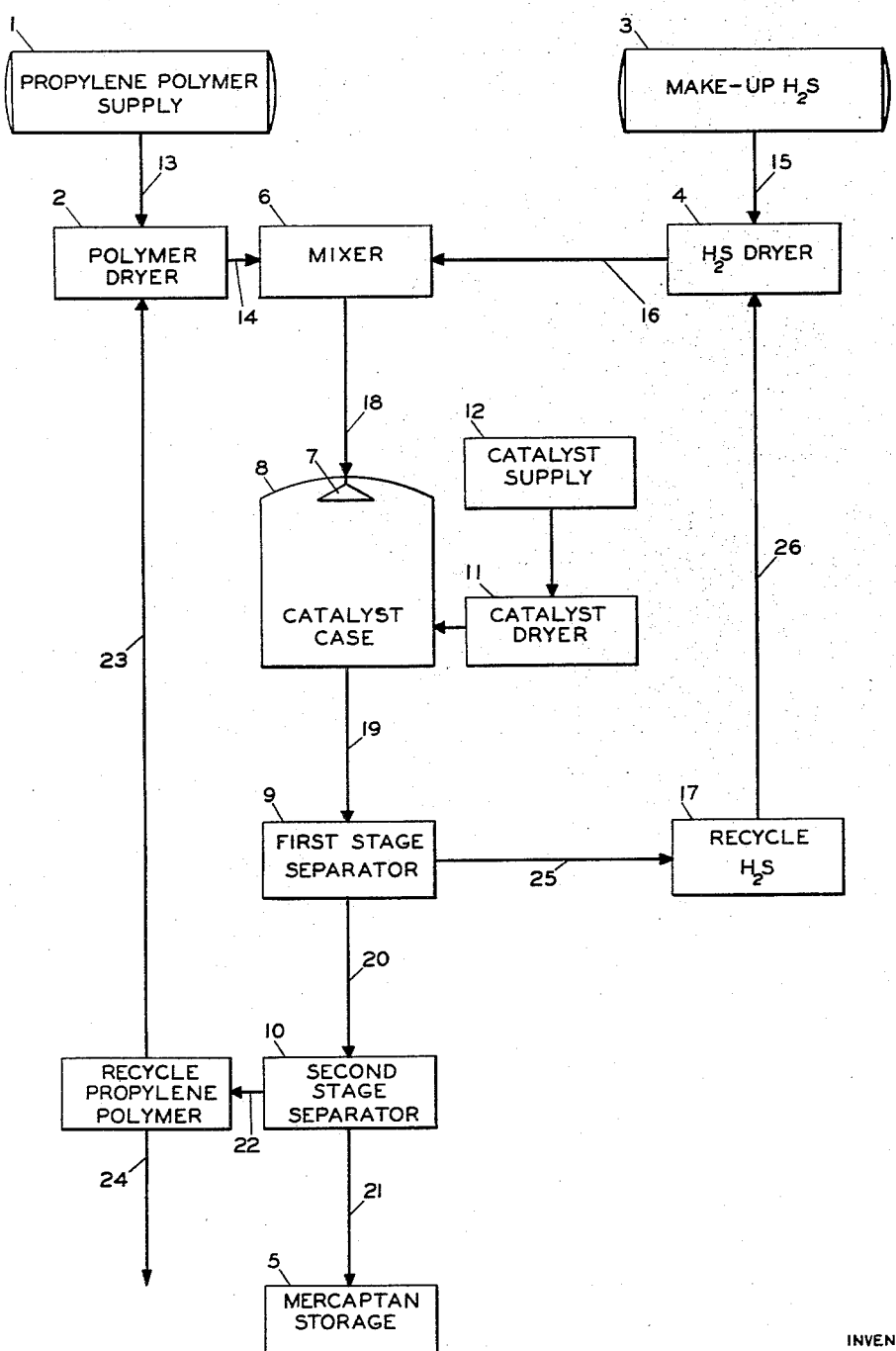

2,950,324

HIGH MOLECULAR WEIGHT MERCAPTAN

Bernard Loev, Philadelphia, and Roland H. Goshorn, Fort Washington, Pa., assignors to Pennsalt Chemicals Corporation, Philadelphia, Pa., a corporation of Pennsylvania Filed Apr. 10, 1958, Ser. No. 727,666

5 Claims. (Cl. 260—609)

This invention relates to the preparation of high molecular weight mercaptans, and more particularly provides a method for the preparation of aliphatic mercaptans containing from 8 to 18 carbon atoms by reaction of a propylene homopolymer with hydrogen sulfide in the presence of a phosphorus oxygen acid catalyst.

High molecular weight aliphatic mercaptans have an extensive industrial market, especially in the rubber manufacturing industry, where they are of particular value as modifiers in the manufacture of synthetic rubber. Ordinarily, these mercaptans are prepared most cheaply and conveniently from olefins.

A variety of catalytic processes for the manufacture of mercaptans from olefins have been advanced hitherto, with particular emphasis on the manufacture of low molecular weight mercaptans. However, the processes suitable for low molecular weight mercaptans are ordinarily not directly applicable when high molecular weight mercaptans are required. A definite gradation in reactivity exists between the lower and higher members of the aliphatic olefin series, thus requiring different conditions for efficient conversion to the corresponding mercaptans. Accordingly, low molecular weight olefins are not full equivalents of high molecular weight olefins, and this is particularly true when said high molecular weight olefins are prepared by polymerization of the lower olefins.

High molecular weight aliphatic mercaptans have hitherto generally been prepared by the catalyzed reaction of hydrogen sulfide with certain olefin polymers comprising polymers of butylenes, under high pressures. This process has several serious disadvantages. The olefin polymers comprising butylenes are notoriously readily depolymerized under the conditions utilized in mercaptan synthesis. This depolymerization is a cause of grave difficulties in conducting the mercaptan synthesis and detracts seriously from the efficiency of the process. The significance of depolymerization in this art is illustrated by the numerous proposals in the patent literature for means to obviate this disadvantageous feature, by pretreatment of the polymer to remove more unstable components and the like.

Another particular disadvantage of the prior art processes for high molecular weight aliphatic mercaptan manufacture is that they are carried out under extremely high pressures. The operating pressures required to obtain even moderate conversions are of the order of 500 to 1500 pounds per square inch gauge (p.s.i.g.). Ordinary factory equipment fabricated for use in the chemical and petroleum industries is rated as useful only up to about 350 p.s.i.g. In industrial practice, the level of about 400 p.s.i.g. is considered to be the breakpoint requiring that standard operating equipment be replaced by the next, more expensive grade, specially designed to resist the higher pressures. Thus, the need for resorting to high pressures in chemical reactions such as mercaptan synthesis imposes burdensome and expensive requirements in plant design.

It is an object of this invention to provide an improved method for the preparation of high molecular weight aliphatic mercaptans.

Another object of this invention is to provide a low pressure method for the preparation of mercaptans of high molecular weight.

A particular object of this invention is to provide a method for the preparation of mercaptans from propylene homopolymers.

Another object is to provide a method for the preparation of aliphatic high molecular weight mercaptans wherein the activity of the catalyst is maintained at a high level for prolonged periods of time.

Another object is to provide a method for the preparation of high molecular weight aliphatic mercaptans employing low pressures and temperatures.

A further object is to provide a method whereby the depolymerization of olefin polymers in the preparation of high molecular weight mercaptans is obviated.

These and other objects will be apparent from a consideration of the following specification and claims.

It has now been found that aliphatic high molecular weight mercaptans containing from 8 to 18 carbon atoms can be prepared in high conversion by the reaction of hydrogen sulfide with a propylene homopolymer of the aforesaid carbon atom range in the presence of a phosphorus oxygen acid catalyst at a pressure of from 50 to 350 p.s.i.g.

One feature of the present process is the very low superatmospheric pressures employed. It has been found that with the presently considered olefin polymers, substantially complete conversion of the polymers to high molecular weight mercaptans is produced at the moderate pressures set forth above; in fact, as discussed in detail hereinafter, little or no advantage is to be gained by operating the process of the invention at a pressure higher than about 200 p.s.i.g. This efficiency at low pressures is to be contrasted with the conditions established to be necessary for the production of substantial conversions of olefin polymers in processes known heretofore, wherein commercially acceptable conversions are attained only under extreme pressures and even then, the conversions obtained are ordinarily limited to 50% as a maximum, and are usually no more than 30–40% per pass. The economic significance of the present process, giving substantially complete conversion in one pass at low pressures, will be immediately appreciated by those skilled in the art. This process is operable in ordinary factory equipment without imposing any strain on the capability of the equipment and avoiding entirely the necessity for specifying apparatus resistant to substantial internal pressures. Plant design for the manufacture of high molecular weight mercaptans is accordingly greatly simplified and costs sharply reduced.

An additional important distinguishing characteristic of the process of this invention is the absence of loss of olefin by depolymerization. In high molecular weight mercaptan synthesis as practiced hitherto, in order to attain practicable conversions per pass, it has been necessary to operate under temperatures conditions conducive to depolymerization. Under these conditions, undesired production of lower olefins and formation of lower mercaptans occurs. To avoid such depolymerization it is necessary to introduce an additional processing step to stabilize the olefin polymer by treatment to remove thermally unstable components. In the present method, on the other hand, without any pretreatment of the polymer, a product is obtained in which low molecular weight mercaptans are entirely absent and all the mercaptan produced is of a molecular weight corresponding to the chain length of the initial olefin polymer. This is true whether the process is operated in the presently preferred moderate temperature range or whether it is conducted at substantially elevated temperatures. Furthermore, the effluent from the process, after removal of the mercaptan produced, is free of low molecular weight olefins and is directly suitable for recycle use, which is also significant as enchancing the economic practicability of the process of this invention.

The propylene homopolymers used in carrying out the present process are known in the art. They are prepared by passing propylene to a polymerization system under conversion conditions of temperature and pressure. In general, the conditions employed in polymerizing propylene comprise pressures on the order of 1000–2000 p.s.i.g. and temperatures of from 100° to 300° C., depending on the nature of the polymerization catalyst employed. The catalyst may be sulfuric acid, an alumina-silica catalyst or like materials known as catalysts for the conversion of olefins to liquid polymers. The polymerized effluent is passed through a fractionating system in which selected cuts are recovered, while other olefinic constituents of the effluent are removed and either recycled to the polymerizer or segregated and utilized for other purposes. The polymers in most general use are identified as $C_9$ (propylene trimer, tripropylene) and $C_{12}$ (propylene tetramer, tetrapropylene) polymers; $C_{15}$ and $C_{18}$ polymers are also available though less commonly used. It is well recognized that the usual propylene polymers consist of mixtures of isomers and may have a small content of olefins not containing a number of carbon atoms which is a multiple of $C_3$. Thus, for example, a tetrapropylene polymer may contain olefins covering the range from $C_{11}$ to $C_{15}$, with about a 75% content of $C_{12}$ olefins. The tetrapropylene products industrially available may boil through the range of from 160° to 225° C. or more narrowly, through the range of from 160° to 200° C. A tripropylene polymer also contains a distribution of olefin polymers, above and below the average $C_9$ carbon atoms content, and typically boils through the range of from 120° to 155° C. These polymers are composed preponderantly of non-terminally olefinic, branched-chain hydrocarbons; and on addition of hydrogen sulfide, form branched-chain mercaptans, the particular configuration of which is determined by the Markownikoff rule for addition to double bonds.

The catalyst employed in the present process is a phosphorus oxygen acid catalyst. It has been discovered in accordance with this invention that a catalyst of this nature may be successfully employed in the present process to produce high conversions to mercaptan over an extended period of time, provided that the catalyst is in a substantially dry state.

Dryness of the catalyst is imperative both for production of high conversions and for maintenance of the conversion level.

In respect to initial conversion, in the absence of appreciation of the significance of hydration of the catalyst, extremely erratic results are obtained in the present process, with yields which are frequently dismayingly low. On the other hand, when a phosphoric acid catalyst is converted to and maintained in a substantially dry state in accordance with this invention, it gives consistently high one-pass conversions, of the order of 80 to 90%, with quantitative yields.

The factor of a decline in activity as the use of the phosphoric acid catalyst is continued is also of considerable importance in the utilization thereof. This decline in activity is due to several factors, and is traceable in large part to the presence of moisture. The deleterious effects of moisture present in reactions have been noted heretofore in reactions employing phosphoric acid catalyst. The hypothesis advanced to account for this phenomenon was that the catalytic acid was dissolved and swept away by the action of the water vapor present in the reactants. This explanation was apparently satisfactory in the reactions considered, inasmuch as pre-drying of the reactants was found to cure the difficulty. However, in the present high molecular weight aliphatic mercaptan synthesis, even the use of thoroughly pre-dried reactants fails to solve the problem of catalyst failure, in the absence of application of a pre-drying treatment to the catalyst. When the catalyst is used without pre-drying, the initial activity of the catalyst suffers a rapid and marked decline in the present process, and produces erratic and unreproducible results. For example, in a series of consecutive runs with pre-dried reactants under the same conditions, the conversion was only 52% initially, and dropped to 43% in the course of the experiment. That the problem here is not one of mere mechanical leaching of the catalyst by moisture present in the reactants despite pre-drying is evidenced by the fact that the same catalyst, when employed at a later time thereupon gave a conversion of 64% under the same conditions as previously gave the 52% conversion. Since the activity of the catalyst could be restored by use under other conditions, as shown by these inconsistent results, it is evident that mere mechanical leaching cannot here be the cause of the catalyst failure.

From the results obtained in the course of the investigation leading to the present invention, it appears that the presently employed phosphoric acid catalyst ordinarily exists in hydrated form. The hydration occurs rapidly on even brief exposure to the moisture of the air. In the present process, absence of hydration is an important and critical factor in determining the success of the operation. Not only does pre-drying improve the activity of the catalyst as measured initially, but also it very considerably suppresses the tendency of the catalyst to decline in activity in use. Even when the reactants are not pre-dried, the decline in activity of a pre-dried catalyst is only slow; and with pre-dried reactants, the activity stays at a substantially even level for a considerable period of time. Accordingly, it forms a particularly preferred embodiment of this invention to conduct the present process with catalyst which is pre-dried, and preferably in substantially anhydrous condition.

Referring now to operation of the process of the invention, the accompanying drawing represents in schematic form one arrangement of apparatus suitable for carrying the process into effect. It will be appreciated that the representation is diagrammatic, and that numerous auxiliary pieces of equipment such as valves, pumps, compressors, heat exchangers, coolers, control instruments, injectors or other methods of producing vacuums and the like, which can readily be supplied by one skilled in the art, are not shown in order to avoid confusion in the drawing.

The makeup propylene polymer is passed from storage represented by rectangle 1 through line 13 to polymer drier 2. Additional propylene polymer is recycled through line 23 to the drier 2 from second stage separator 10. From the drier 2, the propylene polymer feed is passed through line 14 to mixer 6. Hydrogen sulfide in at least an equimolar amount, and preferably a considerable molar excess with respect to the propylene polymer, is passed to $H_2S$ drier 4 through line 15 from make-up $H_2S$ storage 3 and through line 26 from recycle $H_2S$ tank 17. Substantial quantities of hydrogen sulfide may be recycled into drier 4 from the first stage separator 9 through line 26. From drier 4, the total hydrogen sulfide feed is passed through line 16 to mixer 6 where it is mixed with the propylene polymer. From the mixer 6, the mixture of hydrogen sulfide and propylene homopolymer passes through line 18 to enter the catalyst case 8 through distributor 7. Catalyst case 8 contains pre-dried phosphoric acid catalyst which may be taken from storage 12 and passed through catalyst drier 11 before being placed in the catalyst case 8, or may be dried when in place in the catalyst case 8, before contact with the reactants of the present process.

The effluent from the catalyst case is passed through line 19 to the first stage separator 9 where the pressure is lowered sufficiently to flash off substantially all the hydrogen sulfide present in the effluent. The hydrogen sulfide flashed off is taken off through line 25 for recycle via tank 17 and line 26 to the drier 4. After removal of the hydrogen sulfide through line 25, the liquid phase from the first stage separator 9 containing the mercaptan product, may be passed directly, by a line not shown in the drawing, to mercaptan storage 5. Ordinarily, to produce a mercaptan product substantially free of olefin polymer and to recover unreacted olefin polymer, the liquid phase from first stage separator 9 is passed through line 20 to the second stage separator 10. The second stage separator 10 operates at a lower pressure than first stage separator 9. Ordinarily, second stage separator 10 is maintained at sub-atmospheric pressures; and may comprise a vacuum distillation means operated, for example, at 30 mm. Hg or less absolute pressure. The temperature of operation of the second stage separator will vary with the molecular weight of the olefin polymer charge, but will ordinarily be in the range of from room temperature up to about 200° C. In the second stage separator 10, the effluent from the first stage separator 9 is topped, and the toppings, which consist essentially of unreacted propylene polymer, are removed through line 22. The second stage separation will ordinarily be conducted commercially to produce a residue comprising 95% or more aliphatic high molecular weight mercaptan, which is a quality of product of saleable concentration. The high molecular weight aliphatic mercaptan product may be removed through line 21 and sent directly to product storage 5, or, if desired, subjected to a further distillation. Usually mercaptan produced in accordance with this process will require no further treatment than that outlined above.

The amount of propylene polymer topped off in second stage separator 10 and removed through line 22 may vary within wide limits. The process of the invention is outstanding in applicability to the production of maximum one-pass conversion to mercaptans, and may well be so operated. The crude product may then contain 85% or more mercaptan by weight, and concentration by passage through the second stage separator 10 with separation of unreacted olefin polymer for recycle may optionally be bypassed entirely, if the mercaptan content is sufficiently high. On the other hand, substantially complete conversion may alternatively be produced if desired by operating this process on a multipass basis, producing, for example, 50%, 60% or 75% conversion per pass, and recycling the unreacted olefin polymer to the process. Since decomposition of the olefin polymer does not occur in the present process, the yield remains substantially quantitative, even under recycling conditions. This is a particular advantage of the present process, in contrast to the prior art heavy mercaptan synthesis methods wherein the production of quantitative or near-quantitative yields is precluded by reason of the losses of olefin polymer to depolymerization products occurring in recycling operations. As shown in the drawing, it may be advisable in the present process to provide means such as line 24 whereby a bleed stream may be taken off from the main stream of unreacted olefin polymer removed in second stage separator 10 for recycle, whereby the build-up of unreactive and non-olefinic components in the original propylene polymer charge may be minimized. Other than this optional bleed line 24, it is totally unnecessary in the present process to provide any elaborate mechanism for removal of byproducts such as light or intermediate olefins or mercaptans, since these undesired materials are substantially entirely absent from the products of the present process. This freedom from undesired and interfering byproducts is another of the particular advantageous features of this process.

Referring now in more detail to the conditions under which the present process is operated, the molar ratio of hydrogen sulfide to propylene polymer utilized in the practice of this invention is preferably at least 1:1, the stoichiometric ratio for conversion of the olefin polymer to mercaptan. Advantageously the hydrogen sulfide is present in excess, and a ratio of from 2:1 to 6:1 is preferred. A substantial excess of hydrogen sulfide may be used if desired, ranging up to 20:1 or more, but this higher ratio has been found usually uneconomical.

The present reaction can be conducted at temperatures ranging from 15° to 250° C. Even in the higher temperature range, at above 150° C., it is to be noted that the present process produces high molecular weight mercaptan without depolymerization of the olefinic polymer. However, the optimum temperature for maximum conversions with the present process, using the catalyst preferred herein, is in the range of from room temperature (about 25° C.) up to about 100° C. In general the most preferred temperature range is in the range of 80°–90° C.

The present process is carried out under moderate superatmospheric pressures. A plot of conversion versus pressure for the reaction of the present process exhibits an initial steep slope followed by a plateau region in which the rate of increase in conversion with increase in pressure becomes very low. Operation at atmospheric pressure gives economically unfavorable conversions, but there is a 400% increase in the degree of conversion when the pressure is raised from atmospheric to around 100 p.s.i.g. However, a further rise in pressure unexpectedly does not produce a continuation of this tendency, and the effect of increased pressure beyond this point is substantially negligible. For effective operation of this process, it is desirable to employ a pressure substantially above atmospheric pressure. In general, this will be at least about 50 p.s.i.g. The process of this invention is most desirably operated in the pressure region immediately beyond that demarcation point at which the slope of the conversion/pressure curve levels off, above about 100 p.s.i.g. The plateau region in the pressure/conversion plot extends from 100 p.s.i.g. up to about 350 p.s.i.g., and the present process may be operated at pressures throughout this pressure range to produce substantially complete conversion of the propylene polymer to high molecular weight mercaptan. Generally, little or no advantages accrue on raising the pressure above about 200 p.s.i.g. As pointed out above, ordinary factory equipment is usually limited to about 350 p.s.i.g. or below, so the excellent conversions obtained with the present process in the range below about 350 p.s.i.g. are of considerable significance in respect to the commercial application thereof.

The catalyst employed in the present process is a phosphorus oxygen acid catalyst. More particularly, the catalyst of choice herein is a phosphoric acid such as orthophosphoric acid or polyphosphoric acid, supported on a carrier. Many substances may be used for the purpose of inert carriers, typical of which are kieselguhr, pumice, silica gel, wood charcoal, cocoanut charcoal, granulated coke and the like. Silicaceous carriers are especially preferred. A particularly advantageous form of catalyst of this nature comprises a phosphoric acid supported on kieselguhr, the catalyst containing over 50%, and generally from about 60% to about 85% by weight phosphoric acid. In general, the present catalyst will be employed in the form of shaped particles of suitable size, which may, for example, be exposed to the reactants in a catalyst case or bed in a reactor, or supported in suspension in the reacting stream. Particles ranging from fine powders to relatively coarse granules or pellets may be employed, depending on the intended mode of utilization.

For the production of the results of this invention whereby high conversions at a constant conversion level are produced, it is essential that the catalyst be in a substantially dry state. As set forth hereinabove, it has been found that this catalyst appears ordinarily to be hydrated. Whereas the hydration has not hitherto been observed to interfere with its activity in other processes, when it is employed for the preparation of high molecular weight mercaptans in accordance with this invention, even slight hydration of the cataylst causes substantial diminishment of its activity and a rapid decline in the activity level. Accordingly the most preferred embodiment of this invention comprises operating with a pre-dried catalyst, desirably in a substantially anhydrous state.

In order to accomplish drying of the catalyst, it may be heated at a temperature not above 200° C. for a sufficient time to render it substantially anhydrous. If desired, the drying may be accelerated by means such as sweeping the material with hot, dry, inert gas or the like. In general, it has been found that the catalyst used in the process of this invention may be dried satisfactorily by heating material having a particle size ranging from 100–200 mesh up to ¼ inch pellets at, for example, about 170° C. for about 8 to 10 hours.

Although it is not essential to the practice of this invention, it may be desirable that the reactants be pre-dried. Pre-dried reactants are preferred when the present process is operated at about room temperature. The hydrogen sulfide can easily be dried by passage through alumina, which can be reactivated for drying purposes by heating at 200° C. The propylene polymer can be dried by distilling off a small fore-run, thereby steam-distilling out the water. If desired, the water content of the polymer may be removed thoroughly by treatment by calcium chloride or other suitable desiccating materials.

The present reaction will ordinarily be conducted in continuous fashion, the reactants being passed through a catalyst case in a reactor or passed through the reactor in such manner that the catalyst is suspended in the reactant stream. In such operation, catalyst may be withdrawn from the reaction zone continuously or intermittently and replaced or regenerated.

The rate of passage of the reactants through the cataylst bed will vary depending on the activity of the catalyst and on the conversion which is to be produced. In the instant application the rate of feed of the reactants through the catalyst is described by a new term: "mole velocity." Various reference systems have been used hitherto to measure the rate of feed of reactants with respect to catalyst quantity. One measurement which has been commonly used hitherto is "space velocity," which is usually defined as the volume of feed expressed as gaseous volume per volume of catalyst per hour, the volume of gaseous feed being reduced to standard conditions of temperature and pressure (0° C., 1 atm.). However, while this definition is useful when dealing with reactant feeds which are actually gaseous, it does not have reasonable applicability in processes such as that considered herein. In such processes, involving reactions of high-boiling materials under superatmospheric pressure, one is dealing with materials in the liquid phase. Accordingly, some investigators report the rate of feed in such reactions as "liquid volume per volume of catalyst per hour." However, this definition also has serious disadvantages, for now simple comparisons between different feeds can no longer be made, due to the differences in density and molecular weight of the different feeds. Identical liquid space velocities for different feeds may refer to quite different operating conditions, since the same liquid space velocity value means a much more rapid rate of feed in terms of moles for a low molecular weight compound than for a higher. Another objection to measurement of reactant velocities as either gaseous or liquid space velocity is that these terms are measured with reference to volume of catalyst. For different catalyst sizes, the same volume of catalyst actually represents different quantities of catalysts. Thus, for example, with reference to the presently employed catalyst, 500 cc. of ¼ inch pellets weighs 483 grams, whereas 500 cc. of 100–200 mesh catalyst weighs 573 grams. Furthermore, the volume of catalyst measured will of course vary with the degree of thoroughness with which it is packed into the container. Accordingly, to overcome the disadvantages of measuring rate of feed as either gaseous or liquid space velocity, a new term is herein utilized. This term is "mole velocity," defined as grammoles of feed per kilogram of cataylst per day, or poundmoles/1000 pounds catalyst/day.

The use of moles as a measure of feed rate encompasses all physical states and thus avoids alterations in the method of measurement depending on whether the reaction considered takes place in a liquid or gaseous phase. The values obtained with different reactants are directly comparable since they are on a mole basis, so that this method of measurement is in that respect a more useful and significant index than liquid space velocity. Furthermore, since the measure of the catalyst is by weight, all ambiguity concerning the volume of catalyst is eliminated. The values for mole velocity defined as above are not entirely alien to previously used measurement systems, since the results come close to the order of magnitude of gaseous space velocity.

In the present reaction, the rate of feed of the olefin polymer is the essentially controlling factor. It is accordingly measured and cited herein as the mole velocity of the feed; it is to be understood that the hydrogen sulfide feed will increase the overall reactant feed rate by a factor of 2 or more, depending on the ratio of hydrogen sulfide selected. Ordinarily, the propylene polymer mole velocity will be at least 1 g.-mole/kg. catalyst/day, and usually it will be substantially higher than this rate. Propylene polymer mole velocities of as high as about 200 or 300 may be employed, and indeed, substantial conversions have been obtained with mole velocities of tripropylene approaching a value of 500. However, generally for high conversions per pass, lower values will be preferred, and it may be desirable to maintain the olefin polymer mole velocity at below about 100 moles per kilogram of catalyst per day.

The effluent from the catalyst case is subjected to operations as described hereinabove, including recovery of unreacted hydrogen sulfide followed by a stripping operation for the removal of unreacted olefin polymer. The hydrogen sulfide feed is taken off overhead, dried, compressed, and returned to the catalyst feed system where it is blended with the olefin polymer. The olefin removed from the vacuum-stripped, hydrogen sulfide-free effluent may also be recycled directly to the process. This is a particular advantage of the present high molecular weight mercaptan synthesis method, in that the unreacted olefin polymer may be sent directly to recycle without any necessity for first stripping off light and intermediate hydrocarbons and mercaptans. Because of the absence of depolymerization, the process of this invention results in substantially quantitative yields of high molecular weight mercaptan, obviating both losses of polymer to formation of undesired products and also the necessity for additional operations to remove such undesired products.

As noted hereinabove, it is entirely a matter of choice whether the present reaction is conducted so as to obtain the full benefits of the presently afforded possibility of producing substantially complete conversion in one pass; or whether it is operated under such conditions that the conversion per pass is incomplete, and unreacted olefin polymer is recycled to the process. Since the process avoids decomposition of the olefin polymer, it is entirely flexible in this respect. In general, this choice between one-pass and multi-pass conversion will depend chiefly on apparatus limitations and on the desired daily production rate, inasmuch as the yield of high molecular weight mercaptan with respect to olefin polymer converted is, in this process, quantitative. Thus it will be evident that whether the present process is operated to produce substantially complete conversion in one pass or whether it is operated on a multi-pass basis, there are decided economic advantages to operating as described herein.

The invention is further illustrated but not limited by the following examples:

Example 1

This example illustrates the effect of pressure in the present process.

The apparatus employed comprises means for metering the propylene polymer and hydrogen sulfide into a tube in which the reactants are mixed. The mixed reactants are led into a heated reactor tube in which a catalyst bed of granules of phosphoric acid on kieselguhr ("Poly" catalyst manufactured by Universal Oil Products) lies across the path of the reaction mixture. The effluent from the reactor passes through a first stage separator in which the hydrogen sulfide is removed, and then passes to a second stage separator in which, after measurement of the initial mercaptan concentration, the effluent is stripped of olefin polymer to leave a residue comprising mercaptan of commercial grade.

The effect of pressure was tested with a tripropylene polymer as follows. A mixture of tripropylene and hydrogen sulfide in the molar ratio of 1:16 was passed through a bed of 3/16 inch pellets of the above-identified catalyst maintained at 85° C., at a tripropylene mole velocity of 29 moles/kilogram catalyst/day. At a pressure of 135 p.s.i.g., a run carried out under these conditions gave a conversion of 89.5%. On increasing the pressure to 200 p.s.i.g, the measured conversion was substantially unchanged, having a value of 90%; nor was the conversion increased at all by raising the pressure further, to 250 p.s.i.g.

Under substantially the same conditions, a tetrapropylene polymer was passed at 135 p.s.i.g. through a reactor together with hydrogen sulfide. The conversion obtained was 77%. Operating similarly but raising the pressure to 200 p.s.i.g., the conversion was 79.5%; and at 250 p.s.i.g., 81.5%.

It will be readily evident from the foregoing that the effect of increasing the pressure above 135 p.s.i.g. is negligible, so that, contrary to all expectations, there is little or no benefit to be gained by conducting the high molecular weight aliphatic mercaptan synthesis in accordance with this invention at elevated pressures, or indeed, at pressures above about 200 p.s.i.g. On the other hand, there are substantial disadvantages to low pressures. For example, the conversion at atmospheric pressure when tetrapropylene is reacted with hydrogen sulfide under the conditions of this process is only 1/4 as high at atmospheric pressure as it is at 135 p.s.i.g.

Example 2

This example illustrates the effect of drying on the catalyst.

Using apparatus as described in the preceding example, mixtures of hydrogen sulfide and tetrapropylene in a molar ratio of 4:1, respectively, were passed through a bed of the supported phosphoric acid catalyst identified in Example 1, at a tetrapropylene mole velocity of 29, under a pressure of 135 p.s.i.g. The data in the following table illustrate the erratic initial conversions and the rapid decline in activity observed when the catalyst has undergone even slight hydration, and the superiority of the results produced when the catalyst is pre-dried.

| Run | Supported Phosphoric Acid Catalyst | | Temp., °C. | Conversion | |
|---|---|---|---|---|---|
| | Size | State | | Initial, percent | Subsequent |
| 1 | 3/16-inch pellets. | as purchased | 25 | 66 | |
| 2 | do | do | 25 | 34 | |
| 3 | do | do | 25 | 54 | |
| 4 | do | do | 25 | 76 | 66% in 4 hours. |
| 5 | do | do | 25 | 76 | 61% in 5 hours. |
| 6 | do | do | 25 | 66 | 29% in 18 hours. |
| 7 | do | do | 85 | 81 | 71% in 70 hours. |
| 8 | do | fully hydrated | 85 | 20 | 8% in 5 hours. |
| 9 | do | dried | 85 | 80 | level for 320 hours. |
| 10 | 100-200 mesh. | as purchased | 85 | 81.5 | 74% in 12 hours. |
| 11 | do | fully hydrated | 85 | 49 | 25% in 5 hours. |
| 12 | do | dried | 85 | 86 | level to end of test. |

Example 3

This example illustrates the effect of varying operating conditions on the conversions obtained.

PRODUCTION OF C9 MERCAPTAN FROM TRIPROPYLENE AND H2S AT 135 P.S.I.G. OVER DRIED SUPPORTED H3PO4 CATALYST

| Run | Mole Velocity of Tripropylene | Temp., °C. | Ratio of H2S to Tripropylene | Conversion Percent Per Pass |
|---|---|---|---|---|
| 1 | 3.5 | 85 | 4:1 | 93.5. |
| 2 | 7 | 85 | 4:1 | 92.5. |
| 3 | 14 | 85 | 4:1 | 91. |
| 4 | 29 | 85 | 4:1 | 89 level for 60 hours. |
| 5 | 29 | 25 | 4:1 | 87. |
| 6 | 29 | 115 | 4:1 | 82. |
| 7 | 29 | 85 | 4:1 | 89-91. |
| 8 | 29 | 85 | 1.7:1 | 91. |
| 9 | 29 | 85 | 16:1 | 89.5. |
| 10 | 58 | 85 | 4:1 | 85. |
| 11 | 116 | 85 | 4:1 | 81. |
| 12 | 232 | 85 | 4:1 | 77. |
| 13 | 464 | 85 | 4:1 | 60. |

Example 4

This example illustrates the flexibility of the present process.

For purposes of a recycle investigation, crudes were produced titrating respectively 50% tert-dodecyl mercaptan, 65% tert-dodecyl mercaptan, and 75% tert-dodecyl mercaptan. Still fractions were taken by topping the crudes to produce a 95% by weight mercaptan concentration, and the topping from each crude was recycled under conditions giving 73–77% one-pass conversions to tert-dodecyl mercaptan.

On recycling the topping obtained from the product of 75% conversion, 50% of the recycle was converted to additional tert-dodecyl mercaptan, giving an overall conversion of 88%.

Recycling the topping from the crude containing 65% mercaptan gave a conversion of 64% of the recycle to tert-dodecyl mercaptan, so that the over-all conversion here was 87%.

Recycling the topping from the crude containing 50% tert-dodecyl mercaptan produced 70% conversion of the recycle to high molecular weight mercaptan, so that the over-all two-pass conversion was 85% even under these unfavorable conditions.

Example 5

This example illustrates operation of the process of the invention continuously using the apparatus schematically illustrated in the drawing described in detail hereinabove.

Pre-dried tetrapropylene at a rate of 7.5 pounds per minute and pre-dried hydrogen sulfide at a rate of 6.8 pounds per minute are mixed and passed through 10 cubic feet of phosphoric acid catalyst to produce tert-dodecyl mercaptan at a rate of 7.1 pounds per minute, with recycle of 5.6 pounds per minute hydrogen sulfide and 1.5 pounds per minute topped-off propylene polymer.

Operating the process at a rate of 7 pound-moles per pound of catalyst per day for an extended period gave an average conversion of 82% over a period of twenty-four 15 hour work days; the catalyst was still active at the end of the test.

While the invention has been described with reference to particular preferred embodiments thereof, it is to be understood that it is not limited to the foregoing illustrative examples but other modifications and variations may be made without departure from the scope of the invention.

What is claimed is:

1. Process for the production of high molecular weight mercaptans of from 8 to 18 carbon atoms which comprises passing a mixture of a propylene homopolymer and hydrogen sulfide through a reaction zone containing a phosphoric acid catalyst supported on a siliceous carrier, at a temperature of from about 25° to about 100° C. and at a pressure of from about 50 to about 350 p.s.i.g.

2. Process for the production of aliphatic mercaptans of from 8 to 18 carbon atoms which comprises passing a mixture of a propylene homopolymer and hydrogen sulfide through a reaction zone containing a phosphoric acid catalyst supported on a siliceous carrier, at a temperature of from about 25° to about 100° C. and under a pressure of from about 100 to about 200 p.s.i.g.

3. Process for the preparation of high molecular weight aliphatic mercaptan which comprises passing a mixture of tripropylene and hydrogen sulfide at a temperature of from about 25° to about 100° C. and under a pressure of from about 100 to about 200 p.s.i.g. through a reaction zone containing a phosphoric acid supported on kieselguhr catalyst.

4. Process for the production of high molecular weight aliphatic mercaptan which comprises passing a mixture of tetrapropylene and hydrogen sulfide at a temperature of from about 25° to about 100° C. and under a pressure of from about 100 to about 200 p.s.i.g. through a reaction zone containing a phosphoric acid supported on kieselguhr catalyst.

5. Method for the production of high molecular weight aliphatic mercaptans averaging about 12 carbon atoms per molecule which comprises passing a mixture of tetrapropylene in the liquid phase and hydrogen sulfide at a temperature of from about 25° to about 100° C. and under a pressure of from about 100 to about 200 p.s.i.g. through a reaction zone containing a dry phosphoric acid supported on kieselguhr catalyst.

References Cited in the file of this patent

UNITED STATES PATENTS

| | | |
|---|---|---|
| 2,392,554 | Schulze | Jan. 8, 1946 |
| 2,531,767 | Chenicek | Nov. 28, 1950 |